US011173805B2

(12) United States Patent
Zendler et al.

(10) Patent No.: US 11,173,805 B2
(45) Date of Patent: Nov. 16, 2021

(54) STATE-OF-CHARGE DISPLAY SYSTEM

(71) Applicant: Karma Automotive, LLC, Irvine, CA (US)

(72) Inventors: Jeffrey Zendler, Troy, MI (US); Todd George, Mission Viejo, CA (US); Vino Pathmanathan, Lake Orion, MI (US); Massoud Mahan, Irvine, CA (US); Gerhardt Hohn, Irvine, CA (US); John Papuga, Hermosa Beach, CA (US); Marina Josephs, Newport Beach, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 546 days.

(21) Appl. No.: 15/883,397

(22) Filed: Jan. 30, 2018

(65) Prior Publication Data
US 2019/0232795 A1     Aug. 1, 2019

(51) Int. Cl.
*H02J 7/00* (2006.01)
*B60L 58/12* (2019.01)
*B60Q 1/44* (2006.01)
*B60K 35/00* (2006.01)

(52) U.S. Cl.
CPC .............. *B60L 58/12* (2019.02); *B60K 35/00* (2013.01); *B60Q 1/44* (2013.01); *H02J 7/0047* (2013.01); *B60K 2370/169* (2019.05); *B60K 2370/332* (2019.05); *B60K 2370/338* (2019.05); *B60K 2370/52* (2019.05); *B60K 2370/55* (2019.05); *B60K 2370/797* (2019.05)

(58) Field of Classification Search
CPC .................................................... H02J 7/0047

USPC ......................................................... 320/132
See application file for complete search history.

(56) References Cited

U.S. PATENT DOCUMENTS

| 5,691,078 | A  | * | 11/1997 | Kozaki | G01R 31/3648 |
|---|---|---|---|---|---|
|   |   |   |   |   | 324/428 |
| 6,127,806 | A  | * | 10/2000 | Tanjo | G01R 31/374 |
|   |   |   |   |   | 320/132 |
| 6,784,641 | B2 | * | 8/2004  | Sakai | H02J 9/061 |
|   |   |   |   |   | 320/132 |
| 8,004,241 | B2 | * | 8/2011  | Kim | H02J 7/0047 |
|   |   |   |   |   | 320/132 |

(Continued)

FOREIGN PATENT DOCUMENTS

DE     10 2014 222695 A1     10/2015

OTHER PUBLICATIONS

European Search Report dated Apr. 15, 2019 issued in related European Patent Application No. 19 15 2339; filed Jan. 17, 2019.

*Primary Examiner* — Edward Tso
*Assistant Examiner* — Ahmed H Omar
(74) *Attorney, Agent, or Firm* — Gordon Rees Scully Mansukhani, LLP (57) ABSTRACT

A state-of-charge (SOC) display system includes a battery, a brake light array including multiple lighting elements, and an SOC module. The SOC module is configured to receive a battery status signal including an SOC of the battery. The SOC module is further configured to output a display signal to the brake light array based on the battery status signal. The brake light array is configured to receive the display signal, and illuminate at least a subset of the lighting elements for displaying the SOC of the battery by the brake light array, in response to the display signal.

18 Claims, 6 Drawing Sheets

(56) References Cited

U.S. PATENT DOCUMENTS

| | | | | |
|---|---|---|---|---|
| 9,758,050 | B2* | 9/2017 | Yamamoto | B60L 11/1861 |
| 10,240,542 | B1* | 3/2019 | Salter | F02N 11/08 |
| 2009/0309548 | A1* | 12/2009 | Carkner | H02J 7/0047 |
| | | | | 320/136 |
| 2012/0089273 | A1* | 4/2012 | Seder | B60Q 1/503 |
| | | | | 701/2 |
| 2012/0133282 | A1* | 5/2012 | Rubio | B60Q 1/50 |
| | | | | 315/77 |
| 2012/0313768 | A1* | 12/2012 | Campbell | B60R 25/2018 |
| | | | | 340/438 |
| 2014/0253306 | A1 | 9/2014 | Gillespey | |
| 2014/0301101 | A1* | 10/2014 | Russ | B60Q 1/44 |
| | | | | 362/520 |
| 2016/0243959 | A1* | 8/2016 | Kishida | B60W 20/00 |

* cited by examiner

| SOC DISPLAY CRITERIA | Activation (436) Duty % (+/- 1%) | LIGHTING ELEMENT ILLUMINATION PATTERN |
|---|---|---|
| No Display | 0-10 | ●●●●●●●●●● (460b) |
| Immediate Plug in recognition, OR Plug in outside scheduled charge window, OR charger not ready | 20 | ●●●○○○○●●● (462b) |
| SOC Display (e.g., 80% SOC) | 30 | ●●●●●●●○○○ (466h) |
| Plug in and Charging FAULT | 40 | ●●○○○○○○○○ (468b) |

Fig. 4A

| SOC DISPLAY CRITERIA | INFO DISPLAY (SOC%) until Sleep/Timeout | LIGHTING ELEMENT ILLUMINATION PATTERN |
|---|---|---|
| Plug in and SOC-10% | | ●●●●●●●●●●●●●●●●●○○○○○○○○○○○○○○○○○○○○○ |
| Plug in and SOC-20% | | ●●●●●●●●●●●●●●●●●●●●●○○○○○○○○○○○○○○○○○ |
| Plug in and SOC-30% | | ●●●●●●●●●●●●●●●●●●●●●●●●○○○○○○○○○○○○○○ |
| Plug in and SOC-40% | | ●●●●●●●●●●●●●●●●●●●●●●●●●●●○○○○○○○○○○○ |
| Plug in and SOC-50% | | ●●●●●●●●●●●●●●●●●●●●●●●●●●●●●●○○○○○○○○ |
| Plug in and SOC-60% | | ●●●●●●●●●●●●●●●●●●●●●●●●●●●●●●●●●○○○○○ |
| Plug in and SOC-70% | | ●●●●●●●●●●●●●●●●●●●●●●●●●●●●●●●●●●●○○○ |
| Plug in and SOC-80% | | ●●●●●●●●●●●●●●●●●●●●●●●●●●●●●●●●●●●●●○ |
| Plug in and SOC-90% | | ●●●●●●●●●●●●●●●●●●●●●●●●●●●●●●●●●●●●●● |
| Plug in and SOC-100% | | ○○○○○○○○○○○○○○○○○○○○○○○○○○○○○○○○○○○○○○ |

Fig. 4B

STATE-OF-CHARGE DISPLAY SYSTEM

BACKGROUND

As the transition away from fossil fuels continues, the use of all-electric and hybrid motor vehicles grows ever more popular. Despite their many advantages, the charging of all-electric and hybrid motor vehicles can present logistical challenges. For example, the battery stack typically used in such motor vehicles can take up to several hours to fully recharge. Moreover, because the cost of electric power can vary depending upon the demands being placed on a power grid over the course of a day, it is sometimes advantageous or desirable to charge all-electric or plug-in hybrid motor vehicles during off-peak hours, such as during the evening, early morning, or overnight.

In the conventional art, a lighted ring or other lighted indicator around the vehicle charge port, and/or interior dashboard lighting is typically used to communicate the state-of-charge (SOC) of the motor vehicle during charging. However, due to the length of time required to charge many all-electric or plug-in hybrid motor vehicles, a vehicle owner or operator will typically not remain in the immediate vicinity of the charge port, or in view of the vehicle interior, during charging. Nevertheless, the vehicle owner or operator may wish to easily and periodically check on charging status. As use of all-electric and plug-in hybrid motor vehicles becomes more widespread, there is a growing need for an SOC display solution that enables a vehicle owner or operator to view charging status with ease and at a greater distance from the motor vehicle, and to do so on demand.

SUMMARY

The present disclosure is directed to a state-of-charge (SOC) display system, substantially as shown in and/or described in connection with at least one of the figures, and as set forth in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Despite playing an important role in the transition away from fossil fuel powered transportation, all-electric and hybrid motor vehicles can be time consuming to charge. For example, and as stated above, the battery stack typically used in such motor vehicles can take up to several hours to fully recharge. Moreover, because the cost of electric power can vary depending upon the demands being placed on a power grid over the course of a day, it is sometimes advantageous or desirable to charge all-electric or plug-in hybrid motor vehicles during off-peak hours, such as during the evening, early morning, or overnight.

As also stated above, in the conventional art, a lighted ring or other lighted indicator around the vehicle charge port, and/or interior dashboard lighting is typically used to communicate the state-of-charge (SOC) of the motor vehicle during charging. However, due to the time required to charge an all-electric or plug-in hybrid motor vehicle, a vehicle owner or operator will typically not remain in view of such conventional display solutions during charging, making monitoring of the charge status through use of conventional SOC displays inconvenient. Nevertheless, the vehicle owner or operator may wish to periodically check on charging status. As use of all-electric and hybrid motor vehicles becomes more widespread, there is a growing need for an SOC display solution that enables a vehicle owner or operator to view charging status at a greater distance from the motor vehicle, and to do so on demand.

The present application addresses the inconvenience to all-electric and hybrid motor vehicle owners and operators described above. By utilizing an exterior light array of a motor vehicle to display the SOC of a battery of the vehicle during charging, the present solution advantageously enables the motor vehicle owner or operator to view the SOC from a distance of many meters, such as tens of meters, for example. Moreover, by displaying the SOC in response to a wireless signal received from a remote electronic device controlled by the motor vehicle owner or operator, the present solution further advantageously enables display of the SOC of the battery on demand.

Figure 1:
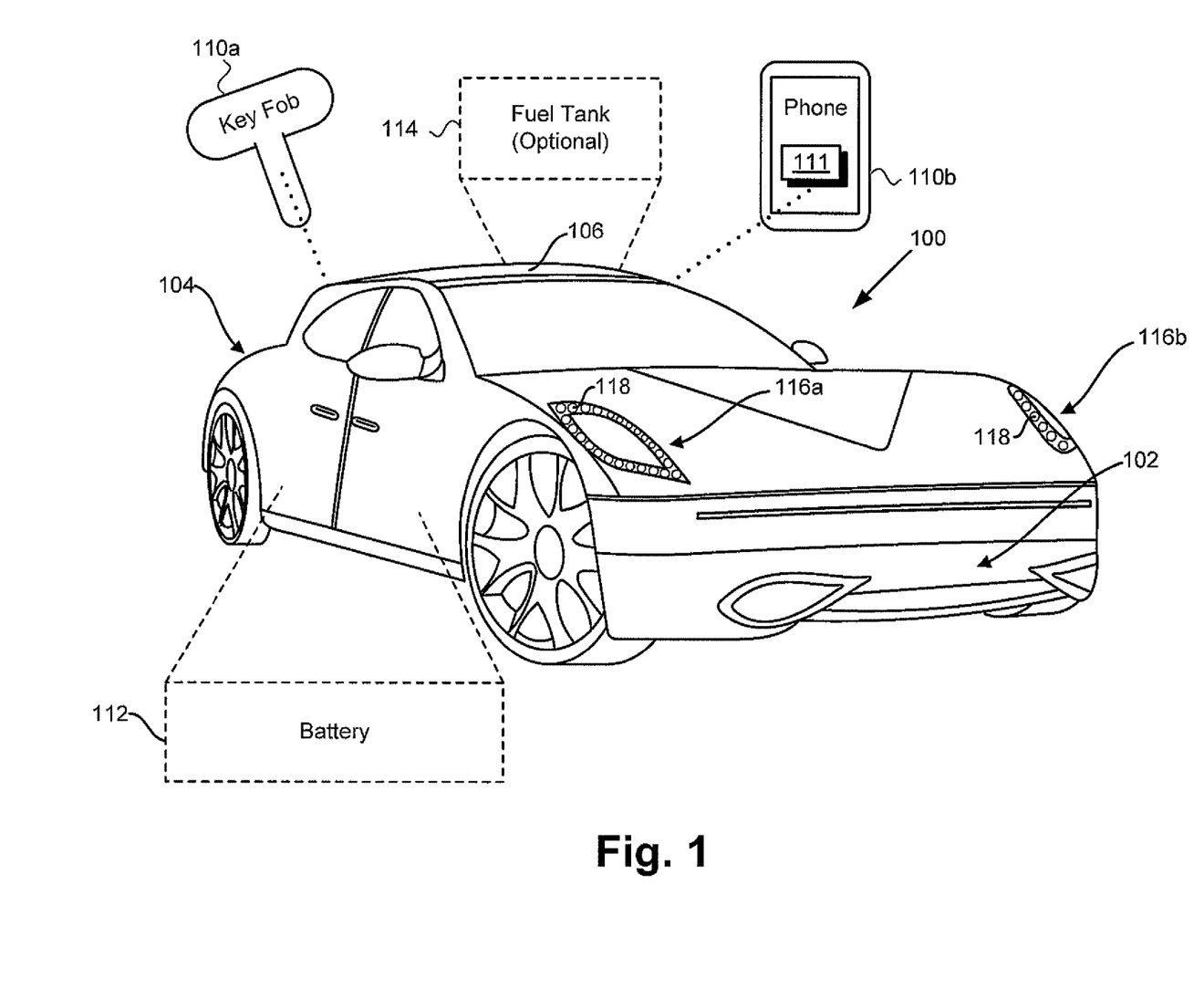
FIG. 1 shows an exemplary all-electric or hybrid motor vehicle, according to one implementation.

FIG. 1 shows exemplary all-electric or hybrid motor vehicle 100, according to one implementation. As shown in FIG. 1, motor vehicle 100 has front end 102, rear end 104, roof 106, and exterior light arrays 116a and 116b each including multiple lighting elements 118. In addition, motor vehicle 100 includes battery 112, and may include optional fuel tank 114. Also shown in FIG. 1 are remote electronic devices 110a and 110b capable of wireless communication with motor vehicle 100. According to the exemplary implementation shown in FIG. 1, remote electronic device 110a is a wireless key fob of motor vehicle 100, while remote electronic device 110b is a mobile phone; however, any other remote electronic device capable of transmitting radio frequency ("RF") signals or other types of signals could be used.

Nevertheless, and as further shown in FIG. 1, in some implementations, remote electronic device 110b may include SOC control application 111 for execution by a hardware processor (hardware processor of remote electronic device 110b not shown in FIG. 1). As noted above, because the cost of electric power can vary depending upon the demands being placed on a power grid over the course of a day, it may be advantageous or desirable to charge motor vehicle 100 during off-peak hours, such as during the evening, early morning, or overnight. Consequently, where remote electronic device 110b includes computing resources sufficient to store and execute SOC control application 111, remote electronic device 110b and SOC control application 111 can be utilized to program motor vehicle 100 to charge battery 112 during one or more desired charging intervals, such as during off-peak hours.

It is noted that, as used in the present application, "battery" may refer to a battery pack including multiple secondary battery cells suitable for use in providing power for propulsion of motor vehicle 100. That is to say, battery 112 may be implemented as a high voltage battery pack including multiple nickel-metal hydride (NiMH), molten-salt, or lithium-ion battery cells, for example, and capable of generating hundreds of volts. It is further noted that although motor vehicle 100 is depicted as an all-electric or hybrid automobile in FIG. 1, that representation is merely exemplary. More generally, motor vehicle 100 may take the form of an all-electric or hybrid automobile, truck, cart, track propelled vehicle, boat, or drone, to name a few examples.

As shown in FIG. 1, exterior light arrays 116a and 116b may be situated at or near front end 102 of motor vehicle 100. Each of exterior light arrays 116a and 116b includes multiple lighting elements 118, which may be implemented using light-emitting diodes (LEDs), for example. According to the inventive principles disclosed in the present application, exterior light arrays 116a and 116b may be utilized as part of an SOC display system for displaying the SOC of battery 112, as well as to provide general lighting for motor vehicle 100 when not displaying the SOC of battery 112. For example, exterior light arrays 116a and 116b may be headlamp arrays of motor vehicle 100, may provide turn signal lighting for motor vehicle 100, or may be implemented as daytime running lights for motor vehicle 100.

Figure 2A:
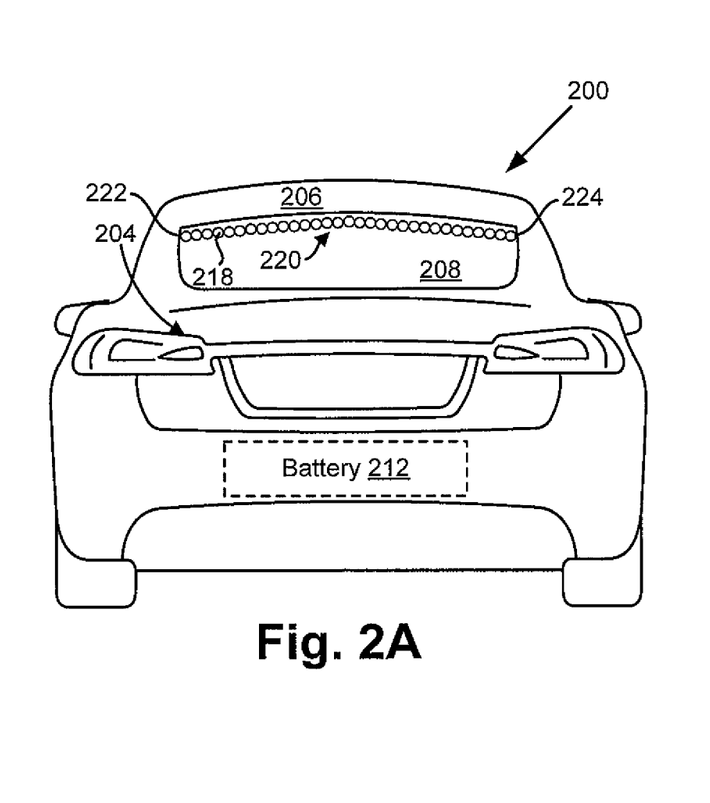
FIG. 2A is a rear view of a motor vehicle showing an exterior light array of the motor vehicle, according to one implementation.

FIG. 2A is a rear view of motor vehicle 200 showing exterior light array 220 as a brake light array of motor vehicle 200, according to one implementation. FIG. 2A shows rear end 204 and roof 206 of motor vehicle 200, as well as exterior light array 220 (hereinafter "brake light array 220") including multiple lighting elements 218. It is noted that brake light array 220 is situated proximate to or on rear window 208 of motor vehicle 200. Moreover, according to the exemplary representation shown in FIG. 2A, as well as in subsequent FIG. 2B, brake light array 220 is implemented as a center high mounted stop lamp (CHMSL). Also shown in FIG. 2A, are first end 222 and second end 224 of brake light array 220, as well as battery 212 of motor vehicle 200.

Motor vehicle 200 including rear end 204, roof 206, rear window 208, and brake light array 220 corresponds in general to motor vehicle 100, in FIG. 1, and those corresponding features may share any of the characteristics attributed to either corresponding feature in the present disclosure. That is to say, although not shown in FIG. 1, motor vehicle 100 may include features corresponding respectively to rear window 208 and brake light array 220. Moreover, although not shown in FIG. 2A, motor vehicle 200 may include features corresponding respectively to front end 102, optional fuel tank 114, and exterior light arrays 116a and 116b. In addition, like motor vehicle 110, motor vehicle 210 may be capable of wireless communication with a remote electronic device corresponding to either or both of key fob 110a and mobile phone 110b, in FIG. 1.

Battery 212 corresponds in general to battery 112, in FIG. 1, and those corresponding features may share any of the characteristics attributed to either corresponding feature in the present disclosure. In other words, like battery 112, battery 212 may be implemented as a high voltage battery pack including multiple NiMH, molten-salt, or lithium-ion battery cells, for example, and capable of generating hundreds of volts.

Lighting elements 218, in FIG. 2A, can correspond in general to lighting elements 118, in FIG. 1, and those corresponding features may share any of the characteristics attributed to either corresponding feature in the present disclosure. In other words, like lighting elements 118, lighting elements 218 may be implemented using LEDs. However, it is noted that although exterior light arrays 116a and 116b including lighting elements 118 provide general lighting for motor vehicle 100/200, brake light array 220 provides brake lighting. Consequently, the color produced by lighting elements 118/218 when illuminated may differ depending on whether they are included in exterior light arrays 116a and 116b, or brake light array 220. Specifically, lighting elements 218 of brake light array 220 may emit red light when illuminated, while lighting elements 118 of exterior light arrays 116a and 116b may emit substantially white or amber light when illuminated, for example.

Figure 2B:
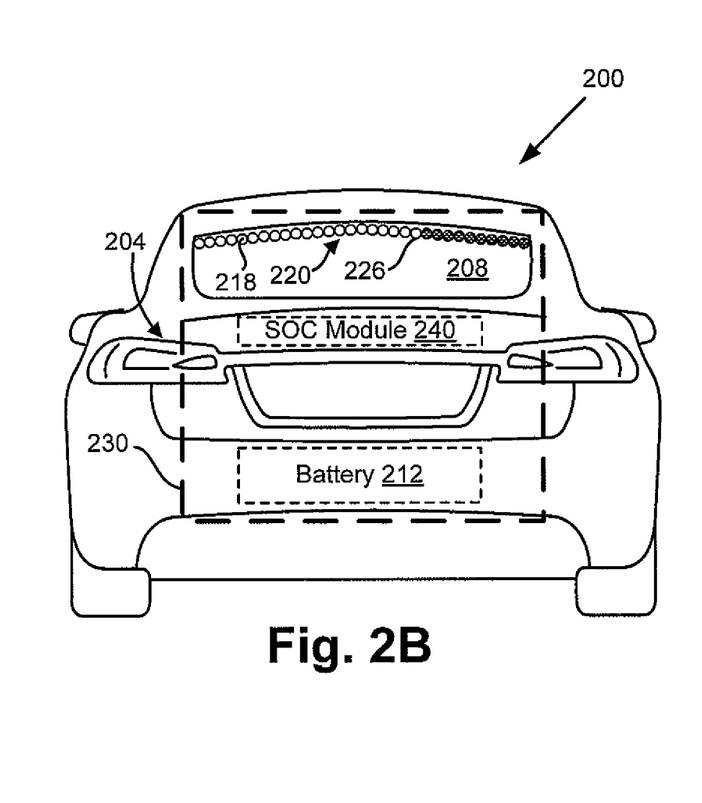
FIG. 2B shows the motor vehicle of FIG. 2A including an exemplary state-of-charge (SOC) display system utilizing the exterior light array to display the SOC of a battery of the motor vehicle, according to one implementation.

FIG. 2B shows motor vehicle 100/200 utilizing SOC display system 230 to display the SOC of battery 112/212 of motor vehicle 110/210 by brake light array 220, according to one implementation. It is noted that features identified by reference numbers identical to those shown in FIG. 2A correspond respectively to those previously described features. It is further noted that not all features common to FIGS. 2A and 2B are identified by reference numbers in both figures. For example, in the interests of clarity, respective first and second ends 222 and 224 of brake light array 220 are present in both FIGS. 2A and 2B, but are identified by reference numbers 222 and 224 only in FIG. 2A.

SOC display system 230 utilized in the exemplary implementation shown in FIG. 2B includes battery 112/212, SOC module 240, which is described in greater detail below, and brake light array 220. However, in another implementation, SOC display system 230 may include battery 112/212, fuel tank 114, SOC module 240, and brake light array 220. In yet other implementations, SOC display system 230 may include fuel tank 114 and/or battery 112/212, SOC module 240, and one or both of exterior light arrays 116a and 116b.

As shown in FIG. 2B, SOC display system 230 including battery 112/212, SOC module 240, and brake light array 220 enables display of the SOC of battery 112/212 using brake light array 220. Comparing FIGS. 2A and 2B, when brake light array 220 is used during braking, substantially all lighting elements 218 of brake light array 220 are concurrently illuminated, as shown in FIG. 2A. By contrast, when brake light array 220 is used by SOC display system 230 including SOC module 240 to display the SOC of battery 112/212, a subset of lighting elements 218 of brake light array 220 corresponding to the SOC of battery 112/212 is illuminated.

For example, and as shown by FIG. 2B, where the SOC of battery 112/212 is less than one hundred percent (100%), a subset of lighting elements 218 corresponding to the percent SOC of battery 112/212 may be illuminated, beginning at first end 222 of brake light array 220 and extending toward second end 224 as far as intermediate lighting element 226. Moreover, lighting elements 218 situated between intermediate lighting element 226 and second end 224 of brake light array 220 may remain off while lighting elements 218 from first end 222 of brake light array 220 to intermediate lighting element 226 are illuminated.

As a specific example, in one implementation, the percentage of the number of lighting elements 218 illuminated to display the SOC of battery 112/212 may substantially match the percent SOC of battery 112/212. Thus, where the SOC of battery 112/212 is 80%, approximately 80% of sequential lighting elements of lighting elements 118/218 beginning at first end 222 of brake light array 220 may be illuminated to display the SOC of battery 112/212. Where brake light array 220 includes sixty (60) lighting elements 218, for instance, the first 48 of lighting elements 218 of brake light array 220 beginning from first end 222 may be illuminated to display an 80% SOC of battery 112/212.

Figure 3A:
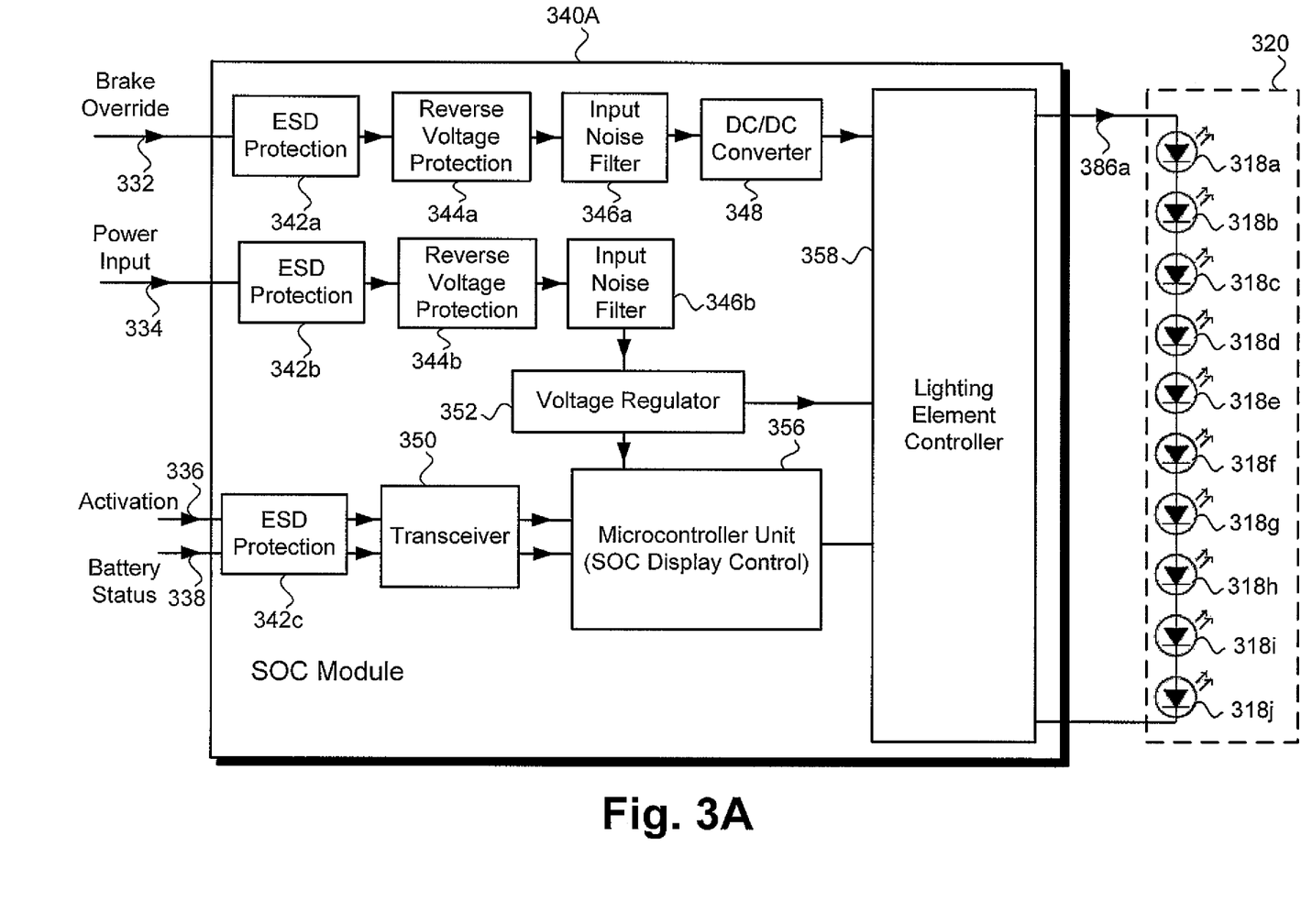
FIG. 3A shows an exemplary SOC module and exterior light array of an SOC display system, according to one implementation.

FIG. 3A shows exemplary SOC module 340A and exterior light array 320 suitable for use as part of SOC display system 230, in FIG. 2B, according to one implementation. SOC module 340A corresponds in general to SOC module 240, and those corresponding features may share any of the characteristics attributed to either corresponding feature by the present disclosure. Exterior light array 320 including lighting elements 318a, 318b, 318c, 318d, 318e, 318f, 318g, 318h, 318i, and 318j (hereinafter "lighting elements 318a-318j") is shown and will be described as corresponding to brake light array 220, in FIGS. 2A and 2B, in the interest of clarity. However, it is noted that, more generally, exterior light array 320 can correspond to any of exterior light arrays 116a or 116b, or brake light array 220.

It is also noted that although lighting elements 318a-318j correspond in general to lighting elements 118/218, each of lighting elements 318a-318j may represent multiple individual lighting elements 118/218. For example, when implemented as LEDs, each of lighting elements 318a-318j may correspond to from 5 to 10 LED lights.

As shown in FIG. 3A, in one implementation SOC module 240/340A may receive inputs in the form of brake override signal 332, power input 334, activation signal 336, and battery status signal 338. Brake override signal 332 is generated when a braking system of motor vehicle 100/200 is activated, for example, when an operator of motor vehicle 100/200 applies the brakes of motor vehicle 100/200. Brake override signal 332 is received by electrostatic discharge (ESD) protection block 342a of SOC module 240/340A, and further passes through reverse voltage protection block 344a, input noise filter 346a, and DC/DC converter 348, before being provided as an input to lighting element controller 358.

Power input 334 provides power for energizing various components of SOC module 240/340A, such as microcontroller unit 356, which may serve as the SOC display controller of SOC module 240/340A, and lighting element controller 358, which controls the illumination of lighting elements 318a-318j. Power input 334 is received by ESD protection block 342b, and further passes through reverse voltage protection block 344b, input noise filter 346b, and voltage regulator 352, which may be a low-dropout regulator, for example, before being provided as an input to each of microcontroller unit 356 and lighting element controller 358.

Activation signal 336 and battery status signal 338 are used by microcontroller unit 356 and lighting element controller 358 to generate display signal 386a. Display signal 386a causes some or all of lighting elements 318a-318j (shown as 218 in FIGS. 2A and 2B) to be illuminated for displaying the SOC of battery 112/212 by exterior light array/brake light array 320 (hereinafter "brake light array 320"). According to the exemplary implementation shown in FIG. 3A, activation signal 336 and battery status signal 338 are received by microcontroller unit 356 via ESD protection block 342c and transceiver 350. It is noted that, in various implementations, activation signal 336 and battery status signal 338 may be received as wired or wireless inputs to SOC module 240/340A.

According to the exemplary implementation shown in FIG. 3A, display signal 386a is generated and provided as an output by SOC module 240/340A based on activation signal 336 and battery status signal 338. Battery status signal 338 includes the SOC of battery 112/212 and may be received by SOC module 240/340A from battery 112/212 of motor vehicle 100/200.

Activation signal 336 may be generated in a number of different ways. For example, activation signal 336 may be generated automatically when motor vehicle 100/200 including SOC display system 230 is plugged in to an external source of electric power. Alternatively, or in addition, activation signal 336 may be generated in response to a wireless signal received from remote electronic device 110a or 110b. That is to say, in some implementations, activation signal 336 may be generated in response to a wireless signal received from key fob 110a of motor vehicle 100/200, or from mobile phone 110b.

In some implementations in which activation signal 336 is generated in response to a wireless signal received from remote electronic device 110a or 110b, that wireless signal may be received due to a manual input to remote electronic device 110a or 110b by a user in possession of remote electronic device 110a or 110b. Alternatively, or in addition, the wireless signal to which generation of activation signal 336 is responsive may be received automatically from remote electronic device 110a or 110b, due to proximity of remote electronic device 110a or 110b to motor vehicle 100/200.

Lighting element controller 358 of SOC module 240/340A provides display signal 386a as an output causing some or all of lighting elements 318a-318j (shown as 218 in FIGS. 2A and 2B) to be selectively illuminated. It is emphasized, however, that brake override signal 332 has preferential control over display signal 386a. As a result, lighting element controller 358 is configured to preferentially provide brake override signal 332 for illuminating substantially all of lighting elements 318a-318j (shown as 218 in FIGS. 2A and 2B), as an output to brake light array 220/320, through display signal 386a, in response to receiving brake override signal 332 with or without power input 334.

Figure 3B:
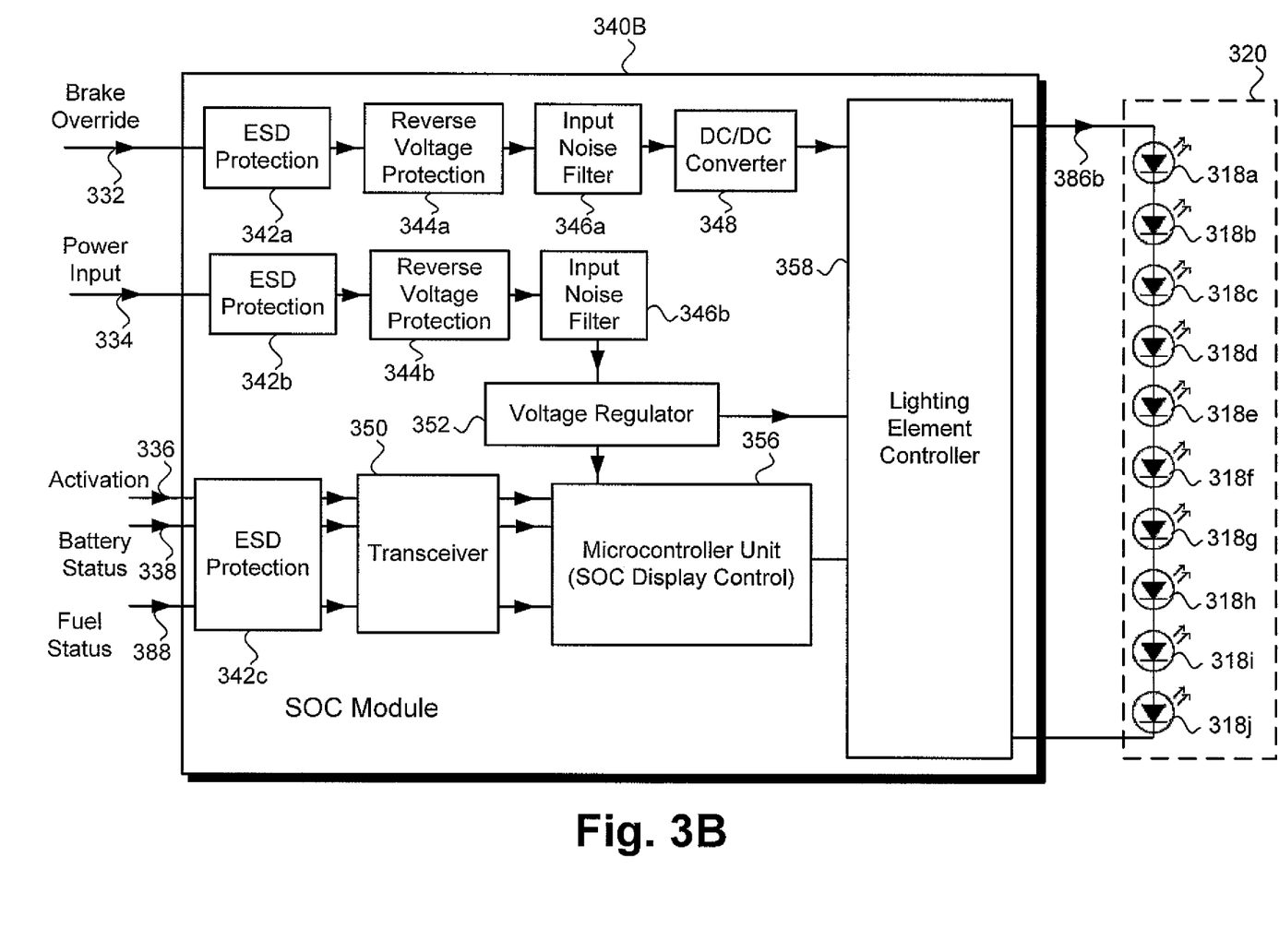
FIG. 3B shows an exemplary SOC module and exterior light array of an SOC display system, according to another implementation.

FIG. 3B shows exemplary SOC module 340B and brake light array 320 suitable for use as part of SOC display system 230, in FIG. 2B, according to another implementation. SOC module 340B corresponds in general to SOC module 240, in FIG. 2, and those corresponding features may share any of the characteristics attributed to either corresponding feature in the present disclosure. Moreover, the features of SOC module 340B identified by reference numbers identical to those shown in FIG. 3A correspond respectively to those previously described features and may share any of the characteristics attributed to those corresponding features in the present disclosure. Thus, although the array of lighting elements 318a-318j is described as brake light array 320 in the interest of clarity, in other implementations, the functionality attributed to brake light array 320 may be provided by exterior light array 116a and/or 116b, in FIG. 1.

In addition to the features shown and described by reference to FIG. 3A, exemplary SOC module 240/340B is shown to receive an additional input in the form of fuel status signal 388. Like activation signal 336 and battery status signal 338, fuel status signal 388 is received by SOC module 240/340B via ESD protection block 342c and transceiver 350, and may be received as a wired or wireless input to SOC module 240/340B. Fuel status signal 388 may be received from optional fuel tank 114 of motor vehicle 100/200, and may correspond to a fuel supply in fuel tank 114.

Microcontroller unit 356 of SOC module 240/340B receives activation signal 336, battery status signal 338, and fuel status signal 388 from transceiver 350. According to the exemplary implementation shown in FIG. 3B, display signal 386b generated and provided as an output by SOC module 240/340B based on activation signal 336, battery status signal 338, and fuel status signal 388. Display signal 386b causes some of lighting elements 318a-318j (shown as 218 in FIGS. 2A and 2B) to be illuminated for displaying the SOC of battery 112/212 by brake light array 320. In addition, according to the present implementation, display signal 386b causes some others of lighting elements 318a-318j (shown as 218 in FIGS. 2A and 2B) to be illuminated for displaying the fuel supply of fuel tank 114 by brake light array 320.

By way of example, a first subset of lighting elements 218/318a-318j including half of those lighting elements, e.g., lighting elements 318a, 318b, 318c, 318d, and 318e (hereinafter "lighting elements 318a-318e") may be used to display the SOC of battery 112/212. According to the same example, a second subset of lighting elements 218/318a-318j including the other half of those lighting elements, e.g., lighting elements 318f, 318g, 318h, 318i, and 318j (hereinafter "lighting elements 318f-318j") may be used to display the fuel supply of fuel tank 114.

In this example, display signal 386b provided as an output from SOC module 240/340B causes some or all of first subset of lighting elements 318a-318e to be selectively illuminated to display the SOC of battery 112/212. Display signal 386b also causes some or all of second subset of lighting elements 318f-318j to be selectively illuminated to display the fuel supply of fuel tank 114. It is emphasized, however, that brake override signal 332 has preferential control over display signal 386b. As a result, lighting element controller 358 is configured to preferentially provide brake override signal 332 for illuminating substantially all of lighting elements 218/318a-318j, as an output brake light array 220/320, through display signal 386b, in response to receiving brake override signal 332 with or without power input 334.

Figure 4A:
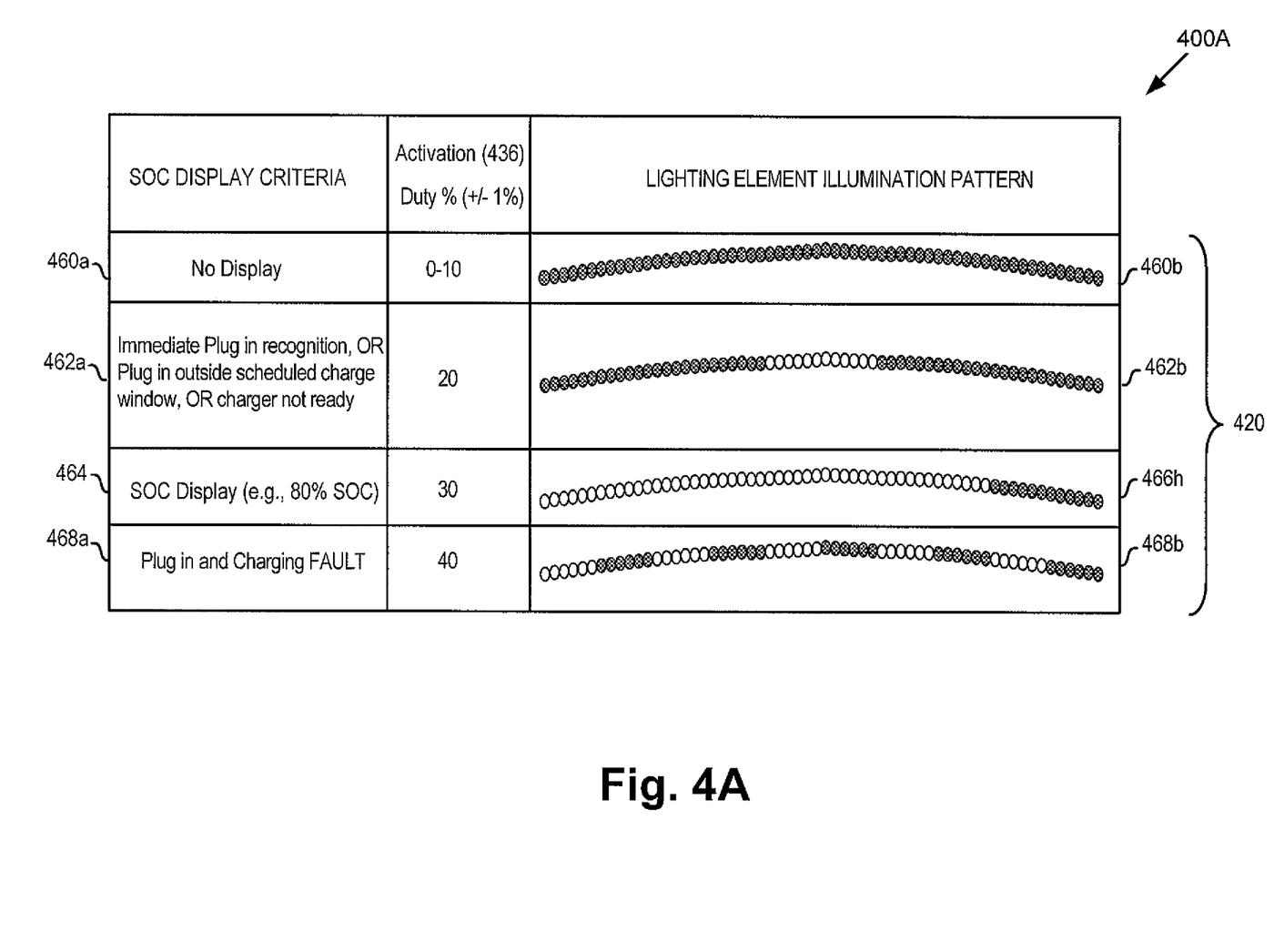
FIG. 4A shows lighting element illumination patterns provided by an SOC display system in various display modes, according to one implementation.
Figure 4B:
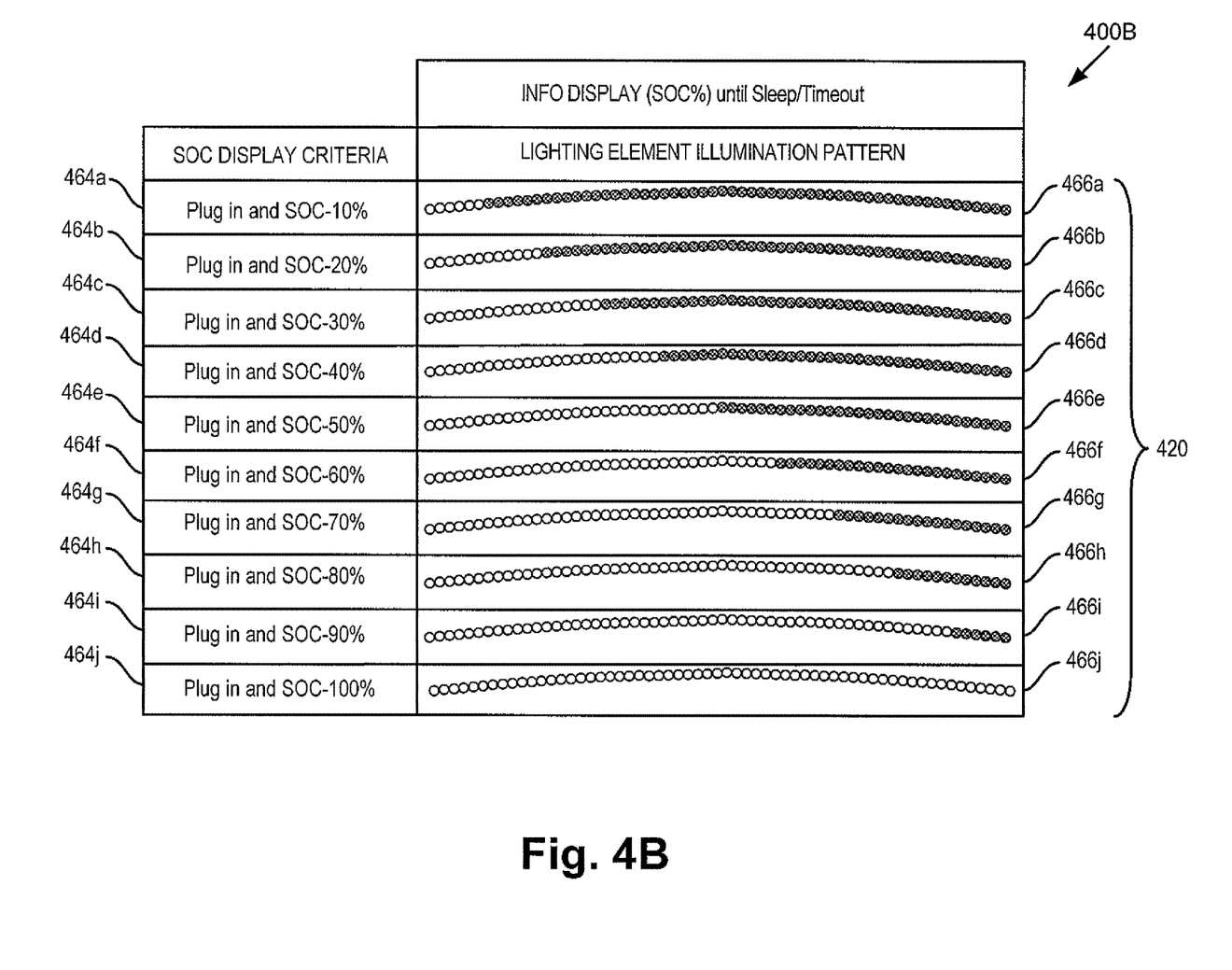
FIG. 4B shows lighting element illumination patterns provided by an SOC display system during an SOC display stage, according to one implementation.

FIG. 4A shows lighting element illumination patterns provided by SOC display system 230, in FIG. 2, during various display modes, while FIG. 4B shows SOC illumination patterns provided by that system during an SOC display stage, according to one implementation. Table 400A of FIG. 4A and table 400B of FIG. 4B show lighting element illumination patterns displayed by brake light array 420 in response to different SOC display criteria.

As shown in FIG. 4A, those SOC display criteria can include no display mode 460a resulting in non-illumination pattern 460b, and mode 462a corresponding to an initiation stage immediately following plug in (also referred to as "immediate plug-in recognition mode"), or to a plug in state in which the external source of electric power is not charging the battery due to scheduling criteria or the external source being offline, resulting in illumination pattern 462b. In addition, the display criteria shown by table 400A includes SOC display mode 464, which can result in illumination patterns corresponding to the measured SOC of the battery and represented in table 400A by exemplary 80% SOC illumination pattern 466h. Also included in table 400A is charging fault mode 468a in which motor vehicle 100/200 is plugged in to an external source of electric power but not charging properly, resulting in illumination pattern 468b.

As further shown in FIG. 4B, in SOC display mode 464, the SOC display criteria can include a variety of SOC charge states 464a, 464b, 464c, 464d, 464e, 464f, 464g, 464h, 464i, and 464j (hereinafter "SOC charge states 46aa-464j") in which motor vehicle 100/200 including battery 112/212 is plugged in to an external source of electric power. In addition to SOC charge states 464a-464j, table 400B shows SOC illumination patterns 466a, 466b, 466c, 466d, 466e, 466f, 466g, 466h, 466i, and 466j (hereinafter "SOC illumination patterns 466a-466j") corresponding respectively to SOC charge states 464a-464j.

Referring to FIG. 4A, FIG. 4A also shows activation signal 436 for display modes 460a, 462a, 464, and 468a. Activation signal 436, in FIG. 4A, corresponds in general to activation signal 336, in FIGS. 3A and 3B, and may share any of the characteristics attributed to that corresponding feature in the present disclosure. As shown in FIG. 4A, activation signal 336/436 has a low or substantially zero value for no display mode 460a, resulting in non-illumination pattern 460b. According to the exemplary implementation shown in FIG. 4A, activation signal 336/436 has a value of substantially 20% of duty cycle for mode 462a, substantially 30% of duty cycle for SOC display mode 464 (i.e., all of SOC charge states 464a-464j), and substantially 40% of duty cycle for charging fault mode 468a.

Referring to FIGS. 4A and 4B in combination and by way of overview, during the initiation stage of mode 462a, SOC display system 230 indicates that it is in an evaluation mode due to activation signal 436 just being turned on in response to a plug in event or in response to a wireless signal received from a key fob or from a mobile phone being carried by a user. While evaluation is in progress, only the central few lighting elements 218/318a-318j are illuminated, as shown by illumination pattern 462b in FIG. 4A, to indicate that SOC display system 230 is in an evaluation or initiation mode.

After passage of a predetermined period of time, such as several seconds, when evaluation of SOC of the battery is complete, lighting elements 218/318a-318j may be illuminated according to the actual SOC of the battery, i.e. transition may be made to one of the SOC illumination patterns 466a-466j or to fault illumination pattern 468b displayed by brake light array 220/320/420. Alternatively, in instances in which plug in is outside of a scheduled charge window or the external source of electrical power is offline, illumination pattern 462b persists after the initiation stage.

As a specific example, in one implementation, following receipt of activation signal 336/436, the initiation stage of the SOC display system may last approximately ten seconds before transition is made to one of SOC illumination patterns 466a-466j or fault illumination pattern 468b displayed by brake light array 220/320/420. In some implementations, illumination pattern 462b, SOC illumination patterns 466a-466j, or fault illumination pattern 468b displayed by brake light array 220/320/420 remain on for only a predetermined amount of time, such as 45 seconds or a few minutes, and then turn off until the next SOC illumination pattern needs to be displayed (for example, to show an increase in the percentage of battery charge) or unless turned on again by user demand (such as use of the key fob or the mobile phone). In other implementations, illumination pattern 462b, SOC illumination patterns 466a-466j, or fault illumination pattern 468b displayed by brake light array 220/320/420 remain on for as long as the vehicle is plugged in.

Brake light array 420, in FIGS. 4A and 4B, corresponds in general to brake light array 220/320 in FIGS. 2A, 2B, 3A, and 3B, and those corresponding features may share the characteristics attributed to any of the corresponding features in the present disclosure. Nevertheless, it is noted that the exemplary lighting element illumination patterns shown in FIGS. 4A and 4B correspond to implementations of SOC display system 230 in which SOC module 240 takes the form of SOC module 340A, shown in FIG. 3A. In other words, the exemplary lighting element illumination patterns displayed by SOC display system 230 during the SOC display stage shown in FIG. 4B, display the SOC of battery 112/212 by brake light array 220/320/420, but not the fuel supply of fuel tank 114.

Referring to FIG. 4A, according to one implementation, during an initiation stage of SOC display system 230, the same illumination pattern, i.e., illumination pattern 462b, is shown for all SOC display criteria with the exception of no display 460a. That is to say, no display SOC display criterion 460a results in non-illumination pattern 460b of lighting elements 218/318a-318j. All other SOC display criteria, i.e., SOC charge states 464a-464j and a fault state result in display of illumination pattern 462b in which only a central subset of lighting elements 218/318a-318j are illuminated during the initiation stage of SOC display system 230.

By way of example, in one implementation, illumination pattern 462b may include illumination of a central 20% of lighting elements 218/318a-318j during the initiation stage. Referring to FIG. 3A, for instance, illumination pattern 462b may result in lighting elements 318e and 318f being illuminated, while lighting elements 318a, 318b, 318c, 318d, 318g, 318h, 318i, and 318j are off.

As shown in FIG. 4B, during an SOC display stage of SOC display system 230 that follows the initiation stage, distinctive illumination patterns are shown for all SOC charge states 464a-464j. For example, illumination pattern 462b may correspond uniquely to mode 462a during the SOC display stage, while all other SOC display criteria, i.e., SOC charge states 464a-464j and charging fault mode 468a result in different respective illumination patterns.

SOC charge state 464a is shown to correspond to a 10% SOC of battery 112/212 during charging. SOC illumination pattern 466a for SOC charge state 464a during the SOC display stage of SOC display system 230 results in approximately 10% of lighting elements 218/318a-318j being illuminated. For example, in one implementation, SOC illumination pattern 466a may include illumination of approximately 10% of consecutive lighting elements of lighting elements 218/318a-318j, beginning at first end 222 of brake light array 220/320, during the SOC display stage. Referring to FIG. 3A, for instance, SOC illumination pattern 466a may result in lighting element 318a being illuminated, while lighting elements 318b, 318c, 318d, 318e, 318f, 318g, 318h, 318i, and 318j are off.

SOC charge state 464b is shown to correspond to a 20% SOC of battery 112/212 during charging. SOC illumination pattern 466b for SOC charge state 464b during the SOC display stage of SOC display system 230 results in approximately 20% of lighting elements 218/318a-318j being illuminated. For example, in one implementation, SOC illumination pattern 466b may include illumination of approximately 20% of consecutive lighting elements of lighting elements 218/318a-318j, beginning at first end 222 of brake light array 220/320, during the SOC display stage. Referring to FIG. 3A, for instance, SOC illumination pattern 466b may result in lighting elements 318a and 318b being illuminated, while lighting elements 318c, 318d, 318e, 318f, 318g, 318h, 318i, and 318j are off.

SOC charge state 464c is shown to correspond to a 30% SOC of battery 112/212 during charging. SOC illumination pattern 466c for SOC charge state 464c during the SOC display stage of SOC display system 230 results in approximately 30% of lighting elements 218/318a-318j being illuminated. For example, in one implementation, SOC illumination pattern 466c may include illumination of approximately 30% of consecutive lighting elements of lighting elements 218/318a-318j, beginning at first end 222 of brake light array 220/320, during the SOC display stage. Referring to FIG. 3A, for instance, SOC illumination pattern 466c may result in lighting elements 318a, 318b, and 318c being illuminated, while lighting elements 318d, 318e, 318f, 318g, 318h, 318i, and 318j are off.

SOC charge state 464d is shown to correspond to a 40% SOC of battery 112/212 during charging. SOC illumination pattern 466d for SOC charge state 464d during the SOC display stage of SOC display system 230 results in approximately 40% of lighting elements 218/318a-318j being illuminated. For example, in one implementation, SOC illumination pattern 466d may include illumination of approximately 40% of consecutive lighting elements of lighting elements 218/318a-318j, beginning at first end 222 of brake light array 220/320, during the SOC display stage. Referring to FIG. 3A, for instance, SOC illumination pattern 466d may result in lighting elements 318a, 318b, 318c, and 318d being illuminated, while lighting elements 318e, 318f, 318g, 318h, 318i, and 318j are off.

SOC charge state 464e is shown to correspond to a 50% SOC of battery 112/212 during charging. SOC illumination pattern 466e for SOC charge state 464e during the SOC display stage of SOC display system 230 results in approximately 50% of lighting elements 218/318a-318j being illuminated. For example, in one implementation, SOC illumination pattern 466e may include illumination of approximately 50% of consecutive lighting elements of lighting elements 218/318a-318j, beginning at first end 222 of brake light array 220/320, during the SOC display stage. Referring to FIG. 3A, for instance, SOC illumination pattern 466e may result in lighting elements 318a, 318b, 318c, 318d, and 318e being illuminated, while lighting elements 318f, 318g, 318h, 318i, and 318j are off.

SOC charge state 464f is shown to correspond to a 60% SOC of battery 112/212 during charging. SOC illumination pattern 466f for SOC charge state 464f during the SOC display stage of SOC display system 230 results in approximately 60% of lighting elements 218/318a-318j being illuminated. For example, in one implementation, SOC illumination pattern 466f may include illumination of approximately 60% of consecutive lighting elements of lighting elements 218/318a-318j, beginning at first end 222 of brake light array 220/320, during the SOC display stage. Referring to FIG. 3A, for instance, SOC illumination pattern 466f may result in lighting elements 318a, 318b, 318c, 318d, 318e, and 318f being illuminated, while lighting elements 318g, 318h, 318i, and 318j are off.

SOC charge state 464g is shown to correspond to a 70% SOC of battery 112/212 during charging. SOC illumination pattern 466g for SOC charge state 464g during the SOC display stage of SOC display system 230 results in approximately 70% of lighting elements 218/318a-318j being illuminated. For example, in one implementation, SOC illumination pattern 466g may include illumination of approximately 70% of consecutive lighting elements of lighting elements 218/318a-318j, beginning at first end 222 of brake light array 220/320, during the SOC display stage. Referring to FIG. 3A, for instance, SOC illumination pattern 466f may result in lighting elements 318a, 318b, 318c, 318d, 318e, 318f, and 318g being illuminated, while lighting elements 318h, 318i, and 318j are off.

SOC charge state 464h is shown to correspond to an 80% SOC of battery 112/212 during charging. SOC illumination pattern 466h for SOC charge state 464h during the SOC display stage of SOC display system 230 results in approximately 80% of lighting elements 218/318a-318j being illuminated. For example, in one implementation, SOC illumination pattern 466h may include illumination of approximately 80% of consecutive lighting elements of lighting elements 218/318a-318j, beginning at first end 222 of brake light array 220/320, during the SOC display stage. Referring to FIG. 3A, for instance, SOC illumination pattern 466h may result in lighting elements 318a, 318b, 318c, 318d, 318e, 318f, 318g, and 318h being illuminated, while lighting elements 318i and 318j are off.

SOC charge state 464i is shown to correspond to a 90% SOC of battery 112/212 during charging. SOC illumination pattern 466i for SOC charge state 464i during the SOC display stage of SOC display system 230 results in approximately 90% of lighting elements 218/318a-318j being illuminated. For example, in one implementation, SOC illumination pattern 466i may include illumination of approximately 90% of consecutive lighting elements of lighting elements 218/318a-318j, beginning at first end 222 of brake light array 220/320, during the SOC display stage. Referring to FIG. 3A, for instance, SOC illumination pattern 466i may result in lighting elements 318a, 318b, 318c, 318d, 318e, 318f, 318g, 318h, and 318i being illuminated, while lighting element 318j is off.

SOC charge state 464j is shown to correspond to a 100% SOC of battery 112/212 during charging. SOC illumination pattern 466j for SOC charge state 464j during the SOC display stage of SOC display system 230 results in substantially 100% of lighting elements 218/318a-318j being illuminated. For example, in one implementation, SOC illumination pattern 466j may include illumination of substantially 100% of consecutive lighting elements of lighting elements 218/318a-318j, beginning at first end 222 of brake light array 220/320, during the SOC display stage. Referring to FIG. 3A, for instance, SOC illumination pattern 466j may result in all of lighting elements 318a-318j being illuminated.

Charging fault mode 468a is shown to correspond to a fault state during charging of battery 112/212. Fault illumination pattern 468b for fault mode 468a during the SOC display stage of SOC display system 230 results in lighting elements 218/318a-318j being illuminated in a non-continuous pattern. For example, in one implementation, fault illumination pattern 468b may include illumination of sequences of approximately 10% of consecutive lighting elements of lighting elements 218/318a-318j alternating with sequences of approximately 10% of consecutive lighting elements of lighting elements 218/318a-318j that are off during the SOC display stage. Referring to FIG. 3A, for instance, fault illumination pattern 468b may result in alternate lighting elements 318a, 318c, 318e, 318g, and 318i being illuminated, while intervening alternate lighting elements 318b, 318d, 318f, 318h, and 318j are off.

In summary, during the initiation stage of SOC display system 230, SOC display system 230 indicates that it is in an evaluation mode due to activation signal 336/436 just being turned on in response to a plug in event or in response to a wireless signal received from a key fob or from a mobile phone being carried by a user. While evaluation is in progress, only the central few lighting elements 218/318a-318j are illuminated as shown in FIG. 4A to indicate that the SOC display system is in an evaluation or initiation mode. After passage of a predetermined period of time, such as several seconds, when evaluation of SOC of the battery is complete, lighting elements 218/318a-318j are illuminated according to the actual SOC of the battery, i.e. transition is made to one of SOC illumination patterns 466a-466j, or fault illumination pattern 468b is displayed, or illumination pattern 462b continues to be displayed by brake light array 220/320/420.

As a specific example, in one implementation, following receipt of activation signal 336/436, the initiation stage of the SOC display system may last approximately ten seconds, during which time illumination pattern 462b is displayed. After the initiation stage, e.g., after ten second, illumination pattern 462b may continue to be displayed, or transition may be made to one of SOC illumination patterns 466a-466j or fault illumination pattern 468b. In some implementations, after the initiation stage elapses, illumination pattern 462b, SOC illumination patterns 466a-466j, or fault illumination pattern 468b displayed by brake light array 220/320/420 remain on for only a predetermined amount of time, such as 45 seconds or a few minutes, and then turn off until the next SOC illumination pattern needs be displayed (for example, to show an increase in the percentage of battery charge) or unless turned on again by user demand (such as use of the key fob or the mobile phone). In other implementations, illumination pattern 462b, SOC illumination patterns 466a-466j, or fault illumination pattern 468b displayed by brake light array 220/320/420 remain on for as long as the vehicle is plugged in.

Thus, the present application addresses the inconvenience to all-electric and plug-in hybrid motor vehicle owners and operators imposed by conventional solutions for displaying the SOC of a battery of the motor vehicle during charging. By utilizing an exterior light array of the motor vehicle to display the SOC of the battery during charging, the present solution advantageously enables the motor vehicle owner or operator to view the SOC from a distance of many meters, such as tens of meters, for example. Moreover, by displaying the SOC in response to a wireless signal received from a remote electronic device controlled by the motor vehicle owner or operator, the present solution further advantageously enables display of the SOC of the battery on demand.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A state-of-charge (SOC) display system comprising:
a battery,
a brake light array including a plurality of lighting elements;
an SOC module configured to:
   receive a battery status signal, said battery status signal including an SOC of said battery; and
   output a display signal to said brake light array based on said battery status signal;
said brake light array configured to:
   receive said display signal from said SOC module; and
   illuminate a first subset of said plurality of lighting elements for displaying said SOC of said battery by said brake light array, in response to said display signal;
wherein during a battery charging operation said SOC module is further configured to:
   turn off said first subset of said plurality of lighting elements after a predetermined time interval; and
   turn on a second subset of said plurality of light elements when the battery reaches a predetermined SOC to show an increase in the percentage of battery charge and subsequently turn off the second subset of said plurality of light elements after the predetermined time interval; wherein said second subset of said plurality of lighting elements is larger than said first subset of said lighting elements.

2. The SOC display system of claim 1, wherein said brake light array is situated proximate to or on a rear window of a motor vehicle.

3. The SOC display system of claim 1, wherein said brake light array comprises a center high mounted stop lamp (CHMSL) of a motor vehicle.

4. The SOC display system of claim 1, wherein said plurality of lighting elements comprises light-emitting diodes (LEDs).

5. The SOC display system of claim 1, wherein an SOC activation signal is generated to activate said SOC module when a motor vehicle including said SOC display system is plugged in to an external source of electric power for charging said battery.

6. The SOC display system of claim 1, wherein an SOC activation signal is generated to activate said SOC module in response to a wireless signal received from a remote electronic device.

7. The SOC display system of claim 6, wherein said remote electronic device is one of a key fob and a mobile phone.

8. A motor vehicle comprising:
a battery;
a fuel tank;
a brake light array including a plurality of lighting elements;
a state-of-charge (SOC) module configured to:
   receive a battery status signal, said battery status signal including an SOC of said battery;
   receive a fuel status signal of said fuel tank, said fuel status signal corresponding to a fuel supply in said fuel tank; and
   output a display signal to said brake light array based on said battery status signal and said fuel status signal;
said brake light array configured to:
   receive said display signal from said SOC module;
   illuminate a first subset of said plurality of lighting elements for displaying said SOC of said battery by said brake light array, in response to said display signal; and
   illuminate a second subset of said plurality of lighting elements for displaying said fuel supply by said brake light array, in response to said display signal;
wherein during a battery charging operation said SOC module is further configured to:
   turn off said first and second subsets of said plurality of lighting elements after a predetermined time interval; and
   turn on a third subset of said plurality of light elements when the battery reaches a predetermined SOC to show an increase in the percentage of battery charge and subsequently turn off the third subset of said plurality of light elements after the predetermined time interval; wherein said third subset of said plurality of lighting elements is larger than said first subset of said lighting elements.

9. The motor vehicle of claim 8, wherein said brake light array is situated proximate to or on a rear window of a motor vehicle.

10. The motor vehicle of claim 8, wherein said brake light array comprises a center high mounted stop lamp (CHMSL).

11. The motor vehicle of claim 8, wherein said plurality of lighting elements comprises light-emitting diodes (LEDs).

12. The motor vehicle of claim 8, wherein an SOC activation signal is generated to activate said SOC module when said motor vehicle is plugged in to an external source of electric power for charging said battery.

13. The motor vehicle of claim 8, wherein an SOC activation signal is generated to activate said SOC module in response to a wireless signal received from a remote electronic device.

14. The motor vehicle of claim 13, wherein said remote electronic device is one of a key fob and a mobile phone.

15. A motor vehicle comprising:
a battery;
an exterior light array; and
a state-of-charge (SOC) module configured to:
   receive a battery status signal, said battery status signal including an SOC of said battery;
   output a display signal to said exterior light array of said motor vehicle based on said battery status signal, said exterior light array including a plurality of lighting elements;
said exterior light array configured to:
   receive said display signal from said SOC module; and
   illuminate a first subset of said plurality of lighting elements for displaying said SOC of said battery by said exterior light array, in response to said display signal;
wherein said exterior light array is utilized by said motor vehicle for a different purpose than said displaying of said SOC of said battery when said motor vehicle is being driven;
wherein an SOC activation signal is generated to activate said SOC module when said motor vehicle is plugged in to an external source of electric power for charging said battery;

wherein during a battery charging operation said SOC module is further configured to:
  turn off said first subset of said plurality of lighting elements after a predetermined time interval; and
  turn on a second subset of said plurality of light elements when the battery reaches a predetermined SOC to show an increase in the percentage of battery charge and subsequently turn off the second subset of said plurality of light elements after the predetermined time interval; wherein said second subset of said plurality of lighting elements is larger than said first subset of said lighting elements.

16. The motor vehicle of claim 15, wherein said plurality of lighting elements comprises light-emitting diodes (LEDs).

17. The motor vehicle of claim 15, wherein an SOC activation signal is generated to activate said SOC module when said motor vehicle is plugged in to an external source of electric power for charging said battery.

18. The motor vehicle of claim 15, wherein an SOC activation signal is generated to activate said SOC module in response to a wireless signal received from a remote electronic device.

* * * * *